Dec. 26, 1933.   D. SPINETTA   1,941,158
AUTOMATIC BRAKE FOR WINDLASSES
Filed Nov. 11, 1932

INVENTOR.
DOMINIQUE SPINETTA

Patented Dec. 26, 1933

1,941,158

UNITED STATES PATENT OFFICE 1,941,158

AUTOMATIC BRAKE FOR WINDLASSES

Dominique Spinetta, Paris, France, assignor to Préparation Industrielle des Combustibles (Societe Anonyme), Nogent-sur-Marne, France Application November 11, 1932, Serial No. 642,313, and in France November 16, 1931

2 Claims. (Cl. 254—173)

The present invention has for object to provide a device to automatically obtain, on the one hand, the braking of the loose drum in scraping windlasses comprising two or three drums and, on the other hand, independently of the initial adjustment, the alteration or modification of the intensity of braking according to the state of tension of the passive cable.

With this sort of windlass, when the active run or running part of the cable winds itself around one of the drums driven by the engine, the passive run is unwound from another drum which is disengaged or out of gear. In order to prevent the cable from unwinding too fast, with all the disadvantages resulting therefrom (loopings, slackening of the windings about the drum, and the like), a slight braking of the said loose drum is required.

In the apparatus as heretofore in use, this braking action was controlled by the workman who operates the windlass by means of a treadle. Now as this operator must moreover actuate the two or three levers used for disengaging the drums, whilst looking after the load of the windlass, it happens that false workings occur due to the complexity of driving or controlling elements.

Moreover, the braking controlled by the foot of the operator ought to be just sufficient to prevent the passive cable from unwinding too quickly, which is very difficult to obtain; when the said braking is too strong, it causes a useless consumption of power and jerks upon the cable; when it is too small, the above named disadvantages still exist.

The present invention does away with the said inconveniences in simplifying the drive and in facilitating the control of the intensity of braking.

The accompanying drawing shows diagrammatically an embodiment of the automatic brake made according to the characteristic features of the invention.

Figure 1:
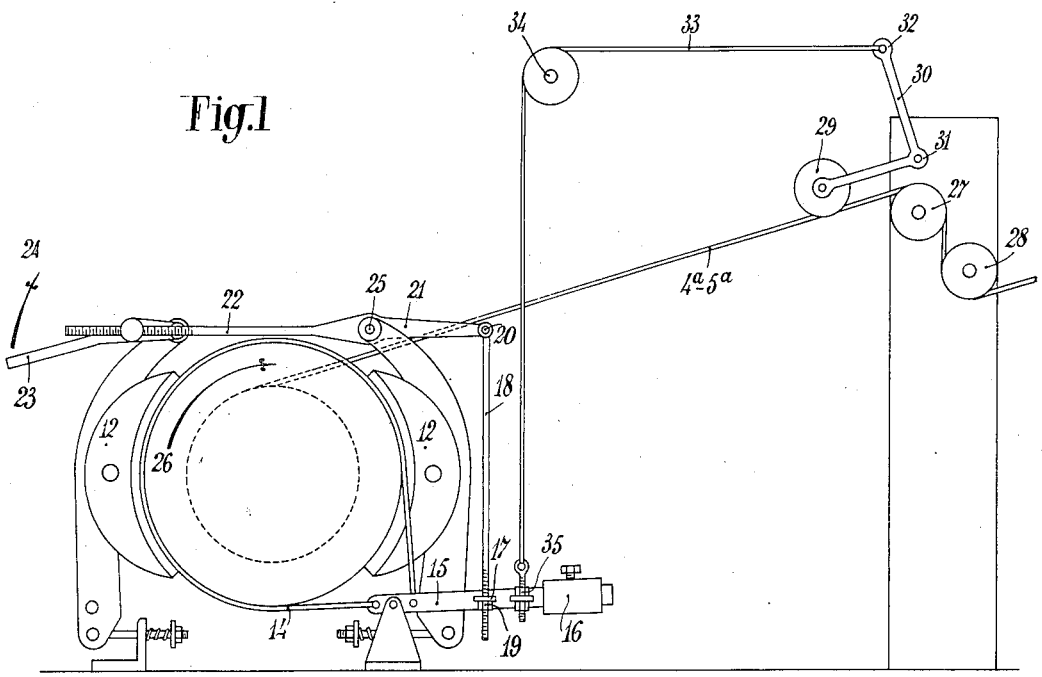
Fig. 1 is a side view of a windlass, provided with an automatic braking device acting during the unwinding of the passive cable.
Figure 2:
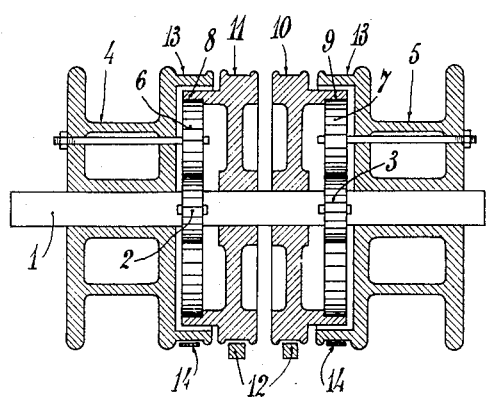
Fig. 2 is a longitudinal section of this same windlass, which is supposed to be provided with two drums.

This system of windlass operates in the following manner:—

The central shaft 1, operated by the motor, carries two central keyed toothed wheels 2 and 3 driving the drums 4 and 5. The latter are operated through the medium of one or several planet wheels such as 6 and 7, meshing with the toothed wheels 2 and 3 and with the toothed rings 8 and 9 connected with the braking rings 10 and 11 which can be acted upon by brakes provided, for instance, with shoes 12.

When the shaft is revolved, its motion will be transmitted or not to one of the drums, according as to whether the corresponding shoe brake will be pressed or not upon its braking ring. Every one of the drums 4 and 5 is provided with a braking ring 13 upon which acts a brake having, for example, a band 14 controlled by a lever 15 and a counterweight 16 which can be shifted along the lever 15 so as to control the action thereof.

Every one of the levers 15 is connected both to the drive of the corresponding brake 12 and a device whose motions depend upon the tension of the corresponding cable ($4^a$ or $5^a$) of the drum, which cable is also situated on the same side. The connection with the brakes 12 is constituted by an eye 17 carried from the lever 15 and in which can slide a rod 18 carrying a nut 19 which, when the shoe brake 12 is applied, sustains the lever 15 and the counterweight 16, thereby maintaining the band brake 14 expanded.

The rod 18 is pivoted at 20 to the end of an arm 21 connected to the operating rod 22 of the shoe brake 12, which rod is, in its turn, operated by means of the lever 23.

Through the medium of a connecting member 35, the lever 15 is secured to a cable 33 which, after having passed round a guide pulley 34, is secured to the eye 32 of a lever 30. This lever, bent at right angle, may rock about an axis or pin 31 secured to a frame carrying pulleys 27 and 28 from which starts the cable ($4^a$ or $5^a$). A pulley 29 is placed at the end of the second arm of the lever 30 and rests upon the cable.

The operation of the brake properly called is as follows:

When the disengagement takes place, that is to say when the shoe brake 12 is loosened, the lever 23 is raised in the direction of the arrow 24. The whole constituted by the rod 22 and the arm 21 rocks about the joint 25. The rod 18 descends and the nut 19 does no longer support the eye 17. The lever 15 and the counterweight 16 are therefore sustained by the cable 33 only. If, at this moment, the passive run of the cable ($4^a$—$5^a$) slackens too much, with the liability of slackening or loosening of the windings about the corresponding drum 4—5, the pulley 29 moves down, by virtue of its own weight and, consequently, the bent lever 30 pivoting about the axis 31, its end 32 moves and the cable 33 releases the counterweight 16 thereby allowing the latter to act upon the band brake 14. The drum is thus braked and the slack of the cable is taken up.

On the contrary, as soon as the cable (4a—5a) is sufficiently taut, the counterweight 16 is raised and the corresponding drum is not uselessly braked. When the run (4a—5a) of the cable is acting, and is consequently taut, the counterweight 16 is raised, both by the cable 33 and the rod 18.

Under these conditions, the band brake 14 cannot be set in action except when the drum upon which it acts is loose and the run corresponding to the said drum is slack, this constituting the best theoretical condition, as the action of the band brake depends upon the range of the movement of the pulley 29 and consequently the tension of the cable with which the tightening of the coils wound about the corresponding drum is to be adjusted.

The rod 18 opposes setting of the band brake when the cable is a driving one, even in case, for example, a jar exerted upon the said cable would cause the pulley 29 to move.

Of course, it is possible, without departing from the scope of the present invention, to dispose in a different manner the driving members of the brake 14, to drive the same by means of any relay or to modify these members for example in dividing the counterweight 16 on the rod 18 and on the cable 33 or in replacing the same by one or several springs, it being understood that the principle of the invention consists in acting, on the one hand, by means of a single drive, such as the one 23, upon the disengagement of the loose drum and upon the braking of the latter and, on the other hand, in controlling the braking of the loose drum, in function of the slack taken by the passive cable. It is furthermore obvious that, according to the relative importance of the effects due to the irregularity of the tension of the cable, it will be sufficient to set in action either the device operated through the cable 33 or simply the device controlled by the rod 18.

What I claim is:

1. In combination, a drive shaft, a cable drum and a brake ring loose thereon, gearing between the shaft, the brake ring and the cable drum, whereby holding of the brake ring against rotation results in a positive drive connection between the shaft and the cable drum and whereby release of the brake ring destroys said driving connection, a brake cooperating with the cable drum, means tending constantly to apply said brake, a brake cooperating with said brake ring, a connection between said brakes whereby application of the brake ring brake effects release of the cable drum brake and whereby the cable drum brake is applied when the brake ring brake is released, and means whereby tightening of the cable effects release of the cable drum brake when the brake ring brake is released.

2. In combination, a drive shaft, a cable drum and a brake ring loose thereon, gearing between the shaft, the brake ring and the cable drum, whereby holding of the brake ring against rotation results in a positive drive connection between the shaft and the cable drum and whereby release of the brake ring destroys said driving connection, a brake cooperating with the cable drum, a lever for operating said brake, means tending constantly to swing said lever in a direction to apply said brake, a brake cooperating with the brake ring, a lever for operating the latter brake, a rod connected to the latter lever and having a lost motion connection with the first mentioned lever whereby application of the brake ring brake effects release of the cable drum brake and whereby the cable drum brake is applied when the brake ring brake is released, and means whereby tightening of the cable effects release of the cable drum brake when the brake ring brake is released.

DOMINIQUE SPINETTA.